(12) United States Patent
Chasman et al.

(10) Patent No.: US 11,657,179 B2
(45) Date of Patent: *May 23, 2023

(54) PROCESSING PRIVATE DATA USING A WORKFLOW ACTION

(71) Applicant: Salesforce, Inc., San Francisco, CA (US)

(72) Inventors: Douglas Eliot Chasman, Pittsford, NY (US); David Chungnan Wu, Redwood City, CA (US); Hugh Francis Cockburn, Irvine, CA (US); Alex Edelstein, San Francisco, CA (US); Antoine Barseni, Ozoir-la-Ferriere (FR); Franck Thomas, Paris (FR); Antoine Magnier, Ablis (FR); Nhi Nguyen, Antony (FR); Benoit Dufourd, Paris (FR); Samantha Reynard, San Francisco, CA (US); Samuel William Bailey, Cardiff (GB)

(73) Assignee: Salesforce, Inc., San Francisco, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/231,235

(22) Filed: Apr. 15, 2021

(65) Prior Publication Data

US 2022/0027503 A1    Jan. 27, 2022

Related U.S. Application Data

(63) Continuation of application No. 16/032,902, filed on Jul. 11, 2018, now Pat. No. 10,990,694.

(51) Int. Cl.
*G06F 21/62* (2013.01)
*G06F 21/31* (2013.01)
(Continued)

(52) U.S. Cl.
CPC ........ *G06F 21/6245* (2013.01); *G06F 9/5033* (2013.01); *G06F 16/256* (2019.01);
(Continued)

(58) Field of Classification Search
CPC .... G06F 21/6245; G06F 21/31; G06F 21/604; G06F 21/6227; G06F 21/2141; G06F 16/256; G06F 16/2471
See application file for complete search history.

(56) References Cited

U.S. PATENT DOCUMENTS

| | | | |
|---|---|---|---|
| 8,402,044 B2* | 3/2013 | Zurek | G06F 16/2471 707/769 |
| 9,911,004 B2* | 3/2018 | Plattner | H04L 41/0813 |

(Continued)

*Primary Examiner* — William Spieler
(74) *Attorney, Agent, or Firm* — Holland & Hart LLP

(57) ABSTRACT

Methods, systems, and devices for processing private data using a workflow action are described. A method may include identifying, at a user device that is authenticated to access a local system, an action of a workflow that is running on an external server that is external to the local system. The action may involve processing private data stored within the local system. The method may further include receiving, at the user device, a direct data query associated with the action, the direct data query including a set of encoded instructions that are self-extracting upon being executed by a browser of the user device. The method may further include executing, by the browser of the user device, the set of encoded instructions to directly access the private data and transmitting an indication of a result of the action based on directly accessing the private data.

20 Claims, 11 Drawing Sheets

(51) Int. Cl.
*H04L 67/00* (2022.01)
*G06F 21/60* (2013.01)
*G06F 16/951* (2019.01)
*G06F 16/958* (2019.01)
*G06F 16/25* (2019.01)
*G06F 16/27* (2019.01)
*H04L 67/1097* (2022.01)
*G06F 9/50* (2006.01)

(52) U.S. Cl.
CPC .......... *G06F 16/278* (2019.01); *G06F 16/951* (2019.01); *G06F 16/972* (2019.01); *G06F 21/31* (2013.01); *G06F 21/604* (2013.01); *G06F 21/6227* (2013.01); *H04L 67/1097* (2013.01); *H04L 67/34* (2013.01); *G06F 2221/2141* (2013.01)

(56) References Cited

U.S. PATENT DOCUMENTS

| | | | | |
|---|---|---|---|---|
| 2005/0187967 | A1* | 8/2005 | Couch | G06Q 30/02 707/999.102 |
| 2012/0278186 | A1* | 11/2012 | Hayton | G06Q 30/0242 705/14.73 |
| 2016/0239681 | A1* | 8/2016 | Plattner | G06F 21/6245 |
| 2018/0018590 | A1* | 1/2018 | Szeto | G16H 50/20 |
| 2019/0204467 | A1* | 7/2019 | Curt | E21B 47/13 |
| 2020/0082010 | A1* | 3/2020 | Bodziony | G06F 16/256 |

* cited by examiner

PROCESSING PRIVATE DATA USING A WORKFLOW ACTION

CROSS REFERENCES

The present application for patent is a continuation of U.S. patent application Ser. No. 16/032,902 by Chasman et al., entitled "PROCESSING PRIVATE DATA USING A WORKFLOW ACTION," filed Jul. 11, 2018, assigned to the assignee hereof.

FIELD OF TECHNOLOGY

The present disclosure relates generally to database systems and data processing, and more specifically to processing private data using a workflow action.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may include a database server that executes a workflow and that communicates with a user device as part of the workflow. In some cases, the workflow may involve processing sensitive data such as personally identifiable information. The sensitive data may be stored in a local or on-premise system, and the database server running the workflow may be external to this local system. Techniques involving transferring and processing the sensitive data as part of the workflow may compromise the security of the sensitive data.

DETAILED DESCRIPTION

Figure 1:
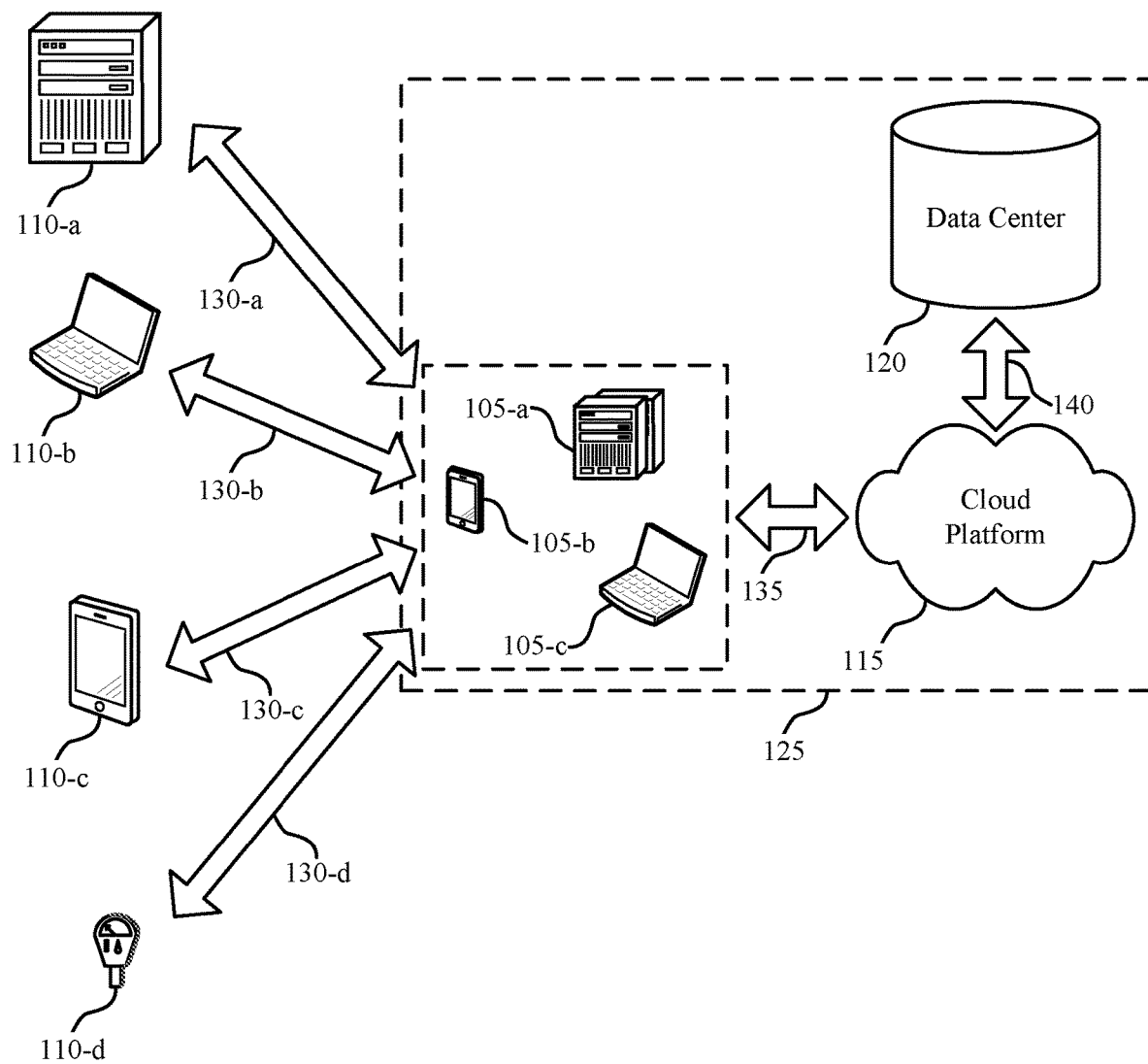
FIG. 1 illustrates an example of a system for database processing that supports processing private data using a workflow action in accordance with aspects of the present disclosure.

A workflow may exist between a database server and a user device. A workflow, for example, may be a series of actions or computations conducted by the database server to transform and process data. A workflow may be primarily executed by a database server, but may be configured, invoked, or otherwise controlled by a user device. In some cases, the user device is part of an on-premise or local system, and the database system is external to the local system. Local systems may include databases that store sensitive data. Conventionally, when a workflow requires sensitive data stored at a local system, the external database server would retrieve the sensitive data from the local system and process the data at the database server. For example, this may be accomplished by adding the database server to a "white list" associated with a firewall of the local system. However, transmitting sensitive data from the local system to the database server increases the risk of compromising the sensitive data.

In accordance with aspects of the present disclosure, rather than transmitting sensitive data from a local system to an external database system as part of a workflow, a user device associated with the local system may directly access and locally process the sensitive data. For example, the user device may temporarily take over the execution of the workflow, access the local data directly, process the data, and return a result of the particular workflow action back to the external database server. In such cases, the sensitive data stays within the local system, which may increase the security associated with the workflow.

In some examples, a user device may be authenticated to access a local system and may conduct at least a portion of a workflow associated with a database server. For example, the user device and local system may be associated with a same organization, and the user device may conduct a workflow associated with a cloud network. When the workflow requires access to sensitive data stored at the local system, the user device may receive a query (e.g., a direct data query) from the database server. The query may, in some examples, include a set of encoded instructions such that, when executed, allow the user device to directly access the private data stored at the local system. The user device may subsequently execute the instructions and access the private data. Upon accessing the data, the user device may transmit an indication of the private data to the external server, such that the external server never accesses the private data directly or is given permission to access the local system. Accordingly, security measures associated with local systems may be improved by limiting access to users and databases capable of accessing sensitive data, and by exchanging sensitive data only with customers of a same organization.

Aspects of the disclosure are initially described in the context of an environment supporting processing private data using a workflow action. Additionally, aspects of the disclosure are described through examples of database processing systems, a user device that supports processing private data using a workflow action, and example process flow diagrams. Aspects of the disclosure are further illustrated by and described with reference to apparatus diagrams, system diagrams, and flowcharts that relate to processing private data using a workflow action.

FIG. 1 illustrates an example of a system 100 for cloud computing that supports processing private data using a workflow action in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, a workflow may exist between one of cloud clients 105 and cloud platform 115 (e.g., via network connection 135). A workflow, for example, may be a series of actions conducted to transform and process information related to a customer (e.g., one or more of contacts 110). In other examples, a workflow may be or may include one or more processes related to an exchange of data between one of cloud clients 105, cloud platform 115, and/or data center 120. In some examples, the workflow may be executed by the cloud platform 115 and/or by a database server (e.g., data center 120). During a workflow initiated by cloud client 105-b, access to private data may be needed. For example, private data may be stored at a local server (e.g., at cloud client 105-a), which may part of a local system associated with cloud client 105-b. Conventionally, for cloud client 105-b to access private data stored at cloud client 105-a as part of a workflow, the external system running the workflow (e.g., the cloud platform 115 and/or the data center 120) may retrieve the private data from the cloud client 105-a, process the data, and transmit the data or a result of the computation to cloud client 105-b. Because allowing the data center 120 to access the private data stored at a local system may expose the local system to substantial security risks (e.g., by allowing an external server access through a firewall), in accordance with aspects of the present disclosure, cloud client 105-b may access the private data from cloud client 105-a directly. As such, the private data can remain within the local system, which may improve the security associated with processing the private data as part of a workflow.

To improve the security measures associated with a local system, and to prevent unauthorized access to the private data stored at a local system, the cloud client 105-b may identify an action of a workflow running on the external server 120. Stated another way, cloud client 105-b may identify particular private data (e.g., stored at local system 105-a) requested by the workflow. In some examples, the cloud client 105-b may receive a query (e.g., from the external server 120) that includes a set of instructions associated with the private data. The instructions may be self-extracting, such that when received by the external server 120, the instructions are automatically downloaded. In some examples, the instructions may include JavaScript.

When the cloud client 105-b receives the instructions, it may access the local system 105-a and, more particularly, the private data stored at the local system 105-a and requested by the workflow. The cloud client 105-b may access the private data, perform the step of the workflow requiring the private data, and subsequently transmit an indication of the data (e.g., of the result of the workflow) to the external server 120. By locally accessing and processing the private data, the workflow may be completed without granting the external server 120 access to the local system 105-a.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
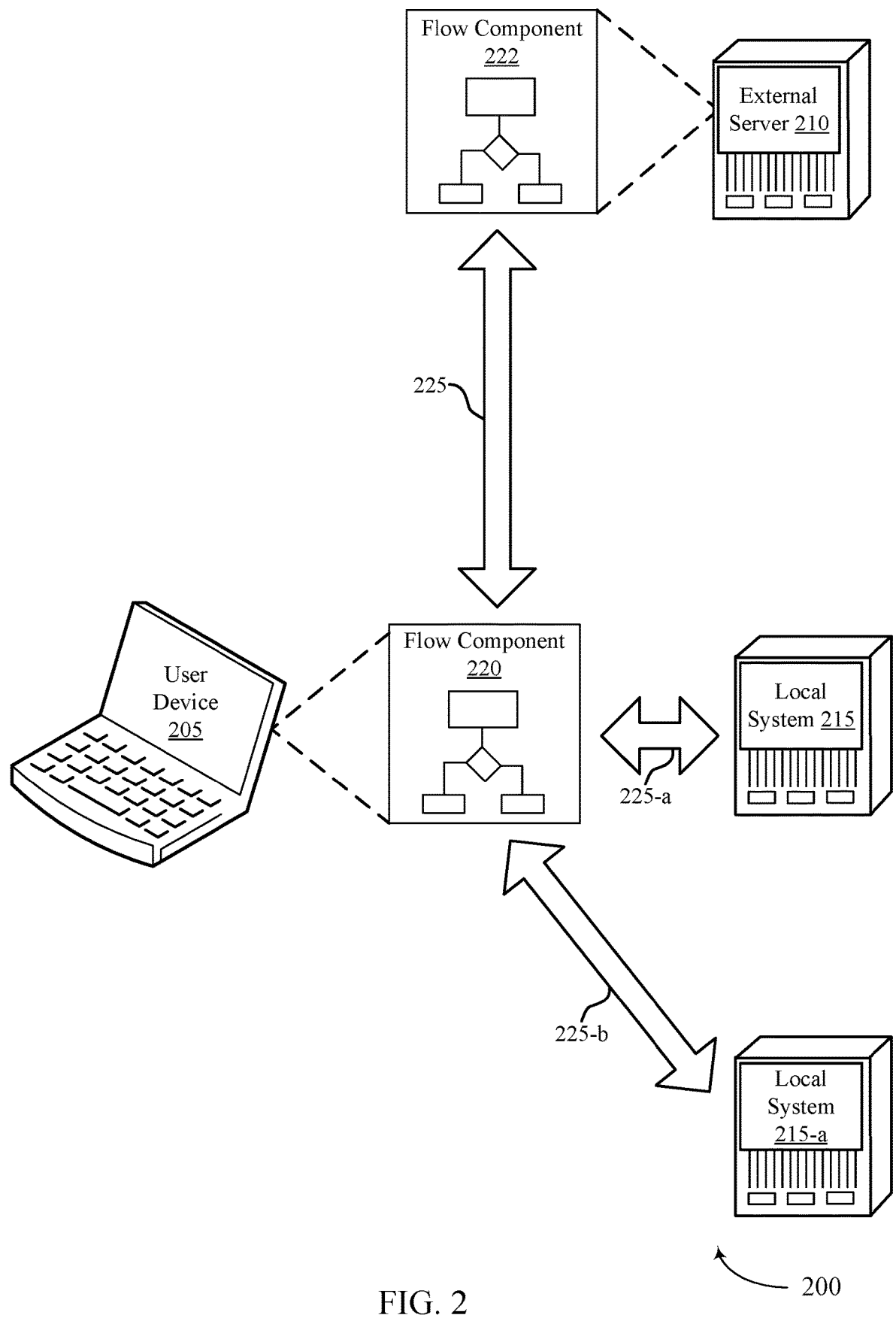
FIG. 2 illustrates an example of a database processing system that supports processing private data using a workflow action in accordance with aspects of the present disclosure.

FIG. 2 illustrates an example of a database processing system 200 that supports processing private data using a workflow action in accordance with aspects of the present disclosure. Database processing system 200 may include a user device 205, an external server 210, and local systems 215, 215-a. User device 205 may be associated with (e.g., authenticated to access) local systems 215, 215-a. In some examples, local system 215 may be or may be referred to as an on-premise system, and local system 215-a may be or may be referred to as a private cloud. Database processing system 200 may support processing private data at either local system 215 or local system 215-a. Additionally or alternatively, database processing system 200 may include flow component 220 and flow component 222 associated with the user device 205 and the external server 210, respectively. User device 205 may communicate with the external server 210 and local systems 215, 215-a via communication links 225, 225-a, and 225-b, respectively.

In some examples, a workflow may exist between user device 205 and external server 210. As described above, a workflow may be a series of actions conducted to transform and process information related to a customer. In some examples, a workflow may include one or more specific actions. For example, a workflow may pertain to determining a user's identity, and an action associated with the workflow may relate to processing and/or verifying the user's Social Security Number (SSN). The process may include, for example, obtaining the user's SSN from local system 215 or local system 215-a for verification purposes. Thus it may be beneficial for the user device 205 to obtain the user's SSN directly from local system 215 or local system 215-a rather than having the external server 210 retrieve the SSN from the local system 215. Because user device 205 may be associated with (e.g., may be authenticated to access) local systems 215, 215-a, the user device 205 may transmit an indication of the private data associated with the action to the external server 210 without either local system 215, 215-a granting the external server 210 access. Thus security measures associated with the local systems 215, 215-a may be improved.

In order to access private data stored at local system 215 or 215-a (e.g., during a workflow), flow component 220 and flow component 222 may be utilized. Flow component 220, for example, may be associated with user device 205 and may include and/or support particular components (e.g., as described with reference to FIG. 3) used for database processing. Flow component 222 may be associated with external server 210 and may interface with particular components (e.g., as described with reference to FIG. 3) used for database processing. Flow component 220 and flow component 222 may communicate, for example, via communication link 225.

As described above, a workflow may exist between user device 205 and external server 210. In some examples, flow component 220 may identify a particular action associated with the workflow, which may require user device 205 to access private data (e.g., data stored at local system 215 or local system 215-a). Based on the identification, code specific to the workflow and action may be transmitted from the external server 210 to the user device 205. Stated another way, flow component 220 may receive (e.g., from flow component 222) instructions (e.g., code) needed to access private data stored at one of local system 215 or local system 215-a. The code may be downloaded by user device 205, which may instruct the user device to communicate with local system 215 and/or local system 215-a to obtain the private data. In some cases, the user device 205 may then locally process the private data or otherwise complete an action associated with the workflow. An indication of the data may be subsequently transmitted from the user device 205 to the external server 210 (e.g., via flow component 220 and flow component 222) such that the action of the workflow may be satisfied without the external server 210 accessing the private data or the private data leaving the local or on-premise system.

Figure 3:
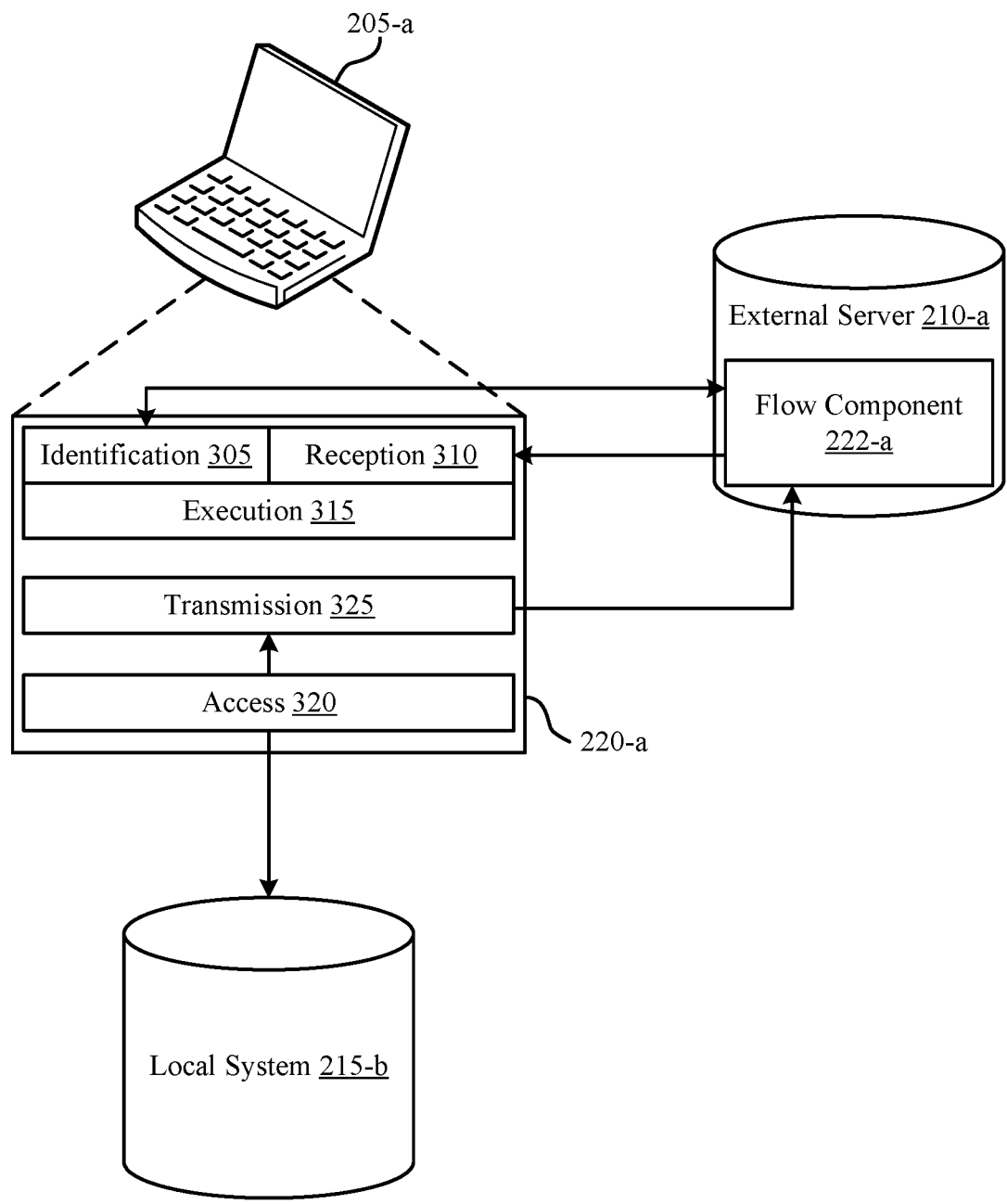
FIG. 3 illustrates an example of a system that includes a user device that supports processing private data using a workflow action in accordance with aspects of the present disclosure.

FIG. 3 illustrates an example of a system 300 that includes a user device 205-a that supports processing private data using a workflow action in accordance with aspects of the present disclosure. The system 300 may include a user device 205-a, which may be an example of a user 205 as described with reference to FIG. 2; an external server 210-a, which may be an example of the external server 210 as described with reference to FIG. 2; and a local system 215-b, which may be an example of local system 215 or local system 215-a as described with reference to FIG. 2.

In some examples, user device 205-a may include flow component 220-a, which may be an example of flow component 220 as described with reference to FIG. 2. Flow component 220 may communicate with a flow component of external server 210-a (e.g., flow component 222-a, which may be an example of flow component 222 as described with reference to FIG. 2) and may facilitate processing private data stored at local system 215-b. In some examples, flow component 220-a may include an identification component 305, a reception component 310, an execution component 315, an access component 320, and a transmission component which, collectively, may facilitate processing private data stored at local system 215-b.

As described above, a workflow may exist between user device 205-a and external server 210-a. In some examples, a workflow may include one or more specific actions, such as verifying the SSN of a user of user device 205-a. The process (e.g., an action associated with the workflow) may include, for example, obtaining the user's SSN from local system 215-b for verification purposes. Accordingly, in some examples, identification component 305 may identify an action of a workflow that is running on external server 210-a that is external to the local system 215-b. As described above, the identified action may involve processing private data stored within the local system 215-b. In some examples, identification component 305 may communicate with flow component 222-*a* in order to identify the action of the workflow.

In some examples, reception component 310 may receive (e.g., from flow component 222-*a*) a direct data query associated with the action. In some examples, the direct data query may be received automatically (e.g., flow component 222-*a* may transmit the data query upon communicating with the identification component 305, as described above), and in other examples the direct data query may be received based on the flow component 220-*a* transmitting a request to the flow component 222-*a*. In either example, the direct data query may include a set of encoded instructions that are self-extracting. Stated another way, the encoded instructions may be downloaded and/or installed on the user device 205-*a* automatically upon being executed by a browser of the user device 205-*a*. By receiving the set of encoded instructions, management of the workflow may be controlled (e.g., temporarily controlled) by the user device 205-*a*. Management of the workflow may be handed-off to the user device 205-*a*, for example, based on a recognition that private data stored at local system 215-*b* is central to the workflow. Stated another way, identification component 305 may identify an action of a workflow that is running on external server 210-*a* that is external to the local system 215-*b*. The user device 205-*a* may then receive (e.g., via reception component 310) a direct data query associated with the action that includes a set of encoded, self-extracting instructions that temporarily pass control of the workflow from the external server 210-*a* to the user device 205-*a*. In some examples, after an indication of the private data is transmitted to the external server 210-*a* (e.g., from user device 205-*a*), control of the workflow may be passed back to the external server 210-*a*.

In some examples, execution component 315 may execute the received set of encoded instructions. Because the instructions are self-extracting, executing the code may result in the encoded instructions being downloaded and/or installed automatically on the user device 205-*a*. In some examples, the code may include instructions that enable the user device 205-*a* to automatically execute the code upon reception. As described above, the code may be executed by a browser of the user device. In some examples, the browser may be associated with a self-contained, reusable portion of an application installed on the user device. Stated another way, because the code may include JavaScript, and because applications installed on the user device may include methods for storing and/or executing JavaScript, the user device 205-*a* may be capable of executing the code without any particular applications and/or software being installed on the user device 205.

After executing the code (e.g., via execution component 315) the user device 205-*a*—via access component 320—may access the private data stored at the local system 215-*b*. In some examples the user device 205-*a* may access the data based on one or more instructions obtained from executing the code. The user device 205-*a* may have access to local system 215-*b* due to user device 205-*a* and local system 215-*b* being associated with a same organization. Thus, executing the code obtained from flow component 222-*a* may provide the user device 205-*a* information on what particular data is to be obtained from the local system 215-*b*.

In some examples, after executing the code, the user device 205-*a*—via transmission component 325—may transmit an indication of the private data to the external server 210-*a*. As described above, the user device 205-*a* may transmit an indication of the data, rather than the data itself. By transmitting an indication of the data, the contents of the private data may be masked from the external server 210-*a* while satisfying the direct data query associated with the workflow. For example, if the workflow was associated with the verification of a user's identification, and the action was associated with verifying the user's SSN, access component 320 may view the SSN stored at local system 215-*b* and transmission component 325 may transmit a binary indication to the external server 210-*a* (e.g., whether or not the SSN is associated with the user in question). Accordingly, a workflow associated with private data may be satisfied without a local system 215-*b* granting access—and subjecting itself to increased security risks—to an external server 210-*a*.

Figure 4:
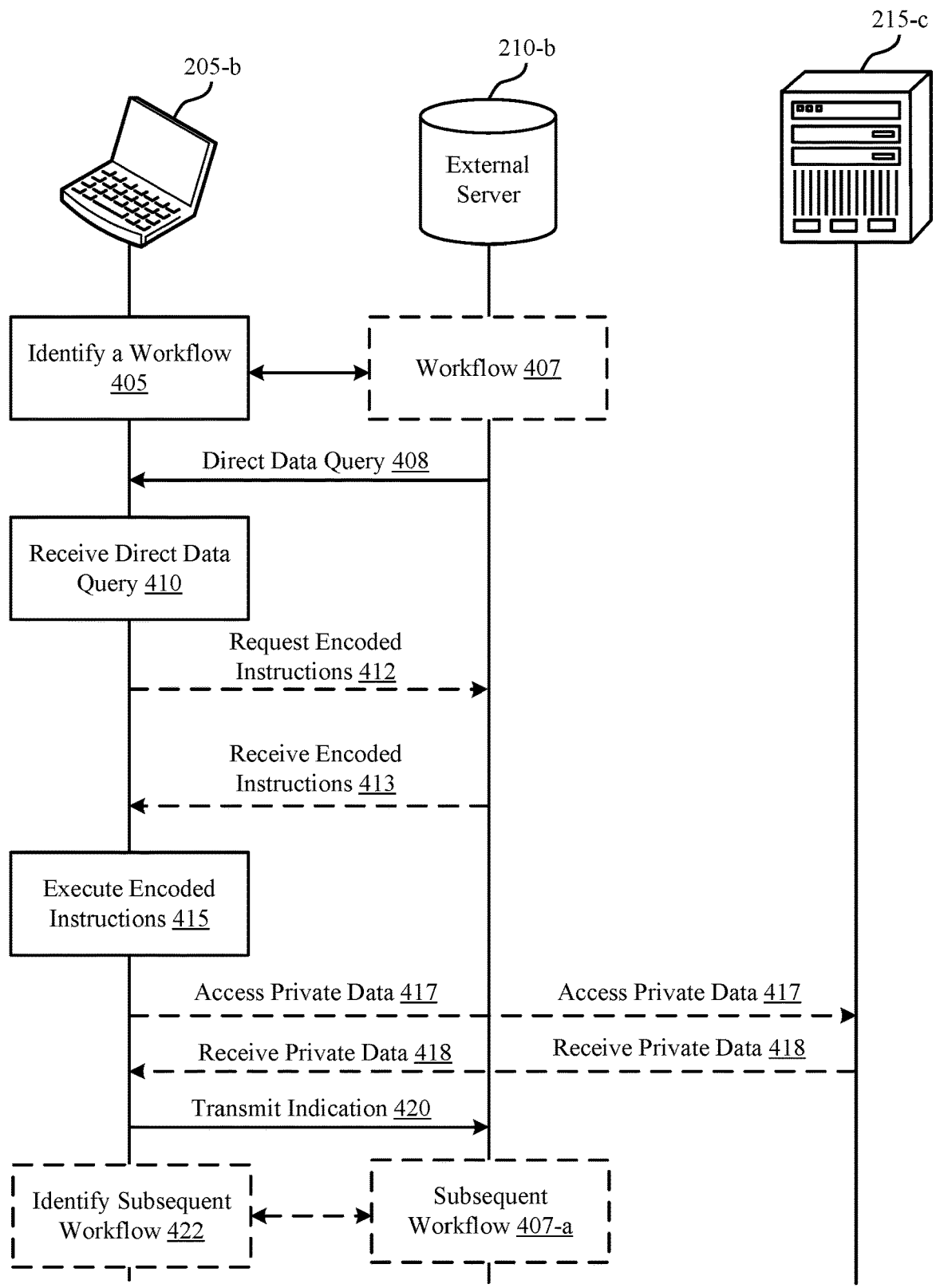
FIG. 4 illustrates an example of a process flow that illustrates processing private data using a workflow action in accordance with aspects of the present disclosure.

FIG. 4 illustrates an example of a process flow 400 that supports processing private data using a workflow action in accordance with aspects of the present disclosure. The process flow 400 may include a user device 205-*b*, which may be an example of a user 205-*a* as described with reference to FIG. 3; an external server 210-*b*, which may be an example of the external server 210-*a* as described with reference to FIG. 3; and a local system 215-*c*, which may be an example of local system 215-*b* as described with reference to FIG. 3.

Process flow 400 may be an example of accessing private data stored at a local system as described above with reference to FIGS. 2 and 3. At step 405, the user device 205-*b* may identify a workflow 407 associated with the external server 210-*b*. In some examples, the user device 205-*b* may identify a workflow, generally, and in other examples the user device 205-*b* may identify a particular step within a workflow. The particular step may, for example, require and/or request locally-stored data (e.g., data stored at local system 215-*c*). As described above, a workflow may be a series of actions conducted in order to transform and process information related to a customer associated with the local system 215-*c* and may request data associated with the local system 215-*c*. In some examples, a workflow may include verifying data stored at and/or exchanged by the user device 205-*b*, local system 215-*c*, and/or external server 210-*b*. Thus, in some examples, the user device 205-*b* and the local system 215-*c* may be associated with a same organization, and user device 205-*b* may be authenticated to access the local system 215-*c*. In some examples, the local system 215-*c* may include or may be referred to as an on-premise system.

After identifying the workflow 407, the user device 205-*b* may receive a direct data query 408 from the external server 210-*b*. Stated another way, the external server 210-*b* may transmit a direct data query 408 to the user device 205-*b*. The direct data query may, for example, include instructions (e.g., executable instructions) that temporarily pass control of the workflow from the external server 210-*b* to the user device 205-*b*. For example, the external server 210-*b* may generate and package the instructions accordingly such that, when executed by the user device 205-*b*, the user device 205-*b* may temporarily control the workflow. At step 410, the user device 205-*b* may receive the direct data query. As described above, the direct data query 408 may be associated with an action (e.g., particular data) of a workflow 407 and may include a set of encoded instructions. In some examples, the direct data query 408 may include the encoded instructions, while in other examples, the user device 205-*b* may request the encoded instructions subsequent to receiving the direct data query 408. Thus, in some examples the user device 205-*b* may request the encoded instructions 412 and may receive (e.g., from the external server 210-*b*) the encoded instructions 413. The encoded instructions may be self-executing, such that when received at the user device 205-*b* the instructions are automatically downloaded and added to the workflow.

At step 415, the user device 205-*b* may execute the instructions. In some examples, the instructions may be self-executable such that, after being downloaded, the instructions are automatically request private data stored at the local system 215-*c* based on the direct data query associated with the action. After executing the instructions, the user device 205-*b* may access the private data 417 stored at the local system 215-*c*. For example, the user device 205-*b* may access the private data 417 independent of the external server 210-*b*. In some examples, the private data may be accessed based on executing the instructions received at the user device 205-*b*. Subsequently, the private data—or an indication of the private data—may be received at the user device 205-*b* (e.g., receive private data 418). Accordingly, the user device may transmit an indication of the private data 420 (e.g., as opposed to the actual data) to the external server 210-*b*. Thus, the workflow 407 may be satisfied without granting the external server 210-*b* access to the local system 215-*c*. Accordingly, a workflow associated with private data may be satisfied without a local system 215-*c* granting access—and subjecting itself to increased security risks—to an external server 210-*b*.

Figure 5:
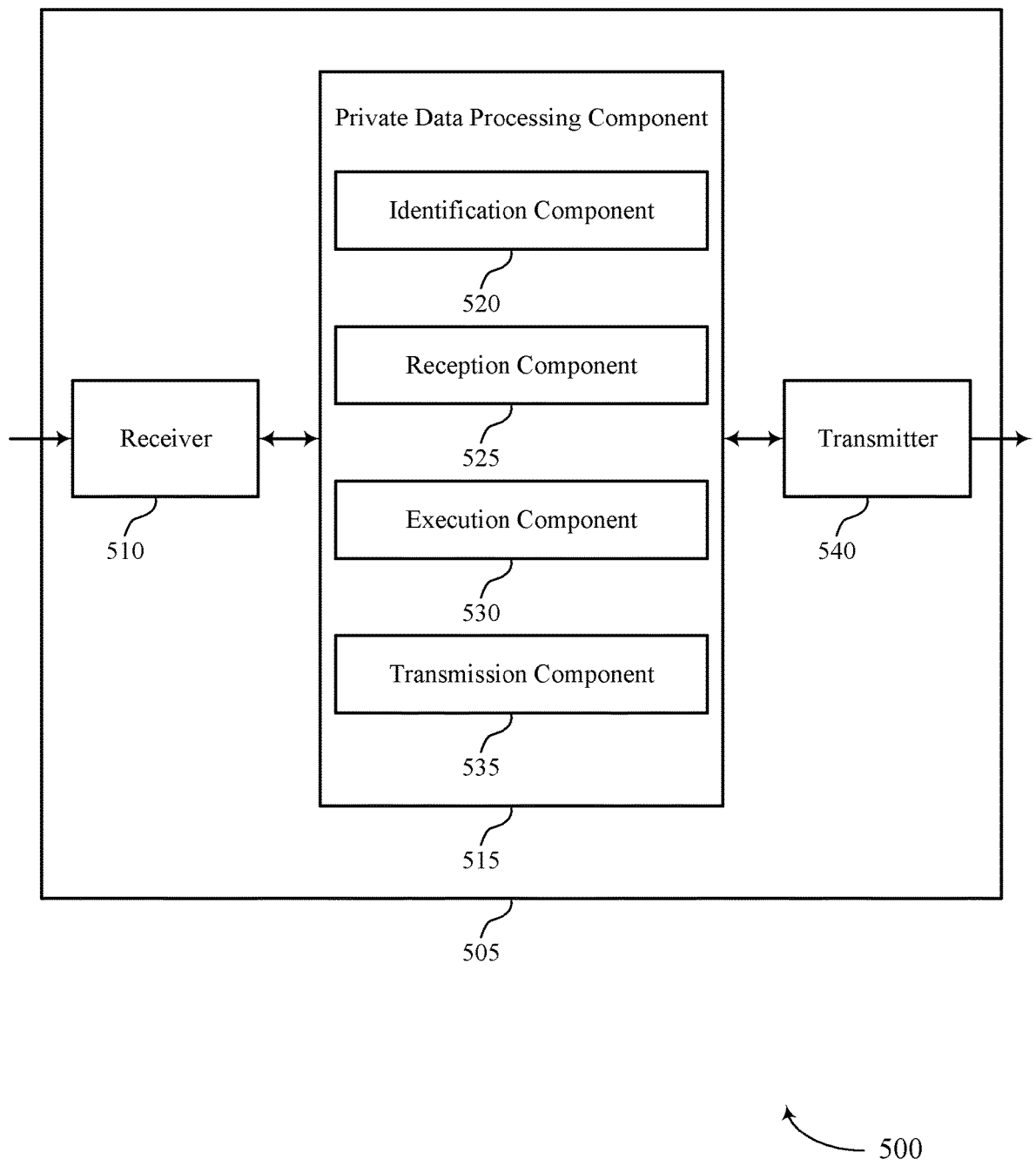
FIG. 5 shows a block diagram of an apparatus that supports processing private data using a workflow action in accordance with aspects of the present disclosure.

FIG. 5 shows a block diagram 500 of a device 505 that supports processing private data using a workflow action in accordance with aspects of the present disclosure. The device 505 may include a receiver 510, a private data processing component 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to processing private data using a workflow action, etc.). Information may be passed on to other components of the device 505. The receiver 510 may be an example of aspects of the transceiver 720 described with reference to FIG. 7. The receiver 510 may utilize a single antenna or a set of antennas.

The private data processing component 515 may include an identification component 520, a reception component 525, an execution component 530, and a transmission component 535. The private data processing component 515 may be an example of aspects of the private data processing component 710 described herein.

The identification component 520 may identify, at a user device that is authenticated to access a local system, an action of a workflow that is running on an external server that is external to the local system, where the action involves processing private data stored within the local system.

The reception component 525 may receive, at the user device, a direct data query associated with the action, the direct data query including a set of encoded instructions that are self-extracting upon being executed by a browser of the user device.

The execution component 530 may execute, by the browser of the user device, the set of encoded instructions to directly access the private data.

The transmission component 535 may transmit an indication of a result of the action based on directly accessing the private data.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
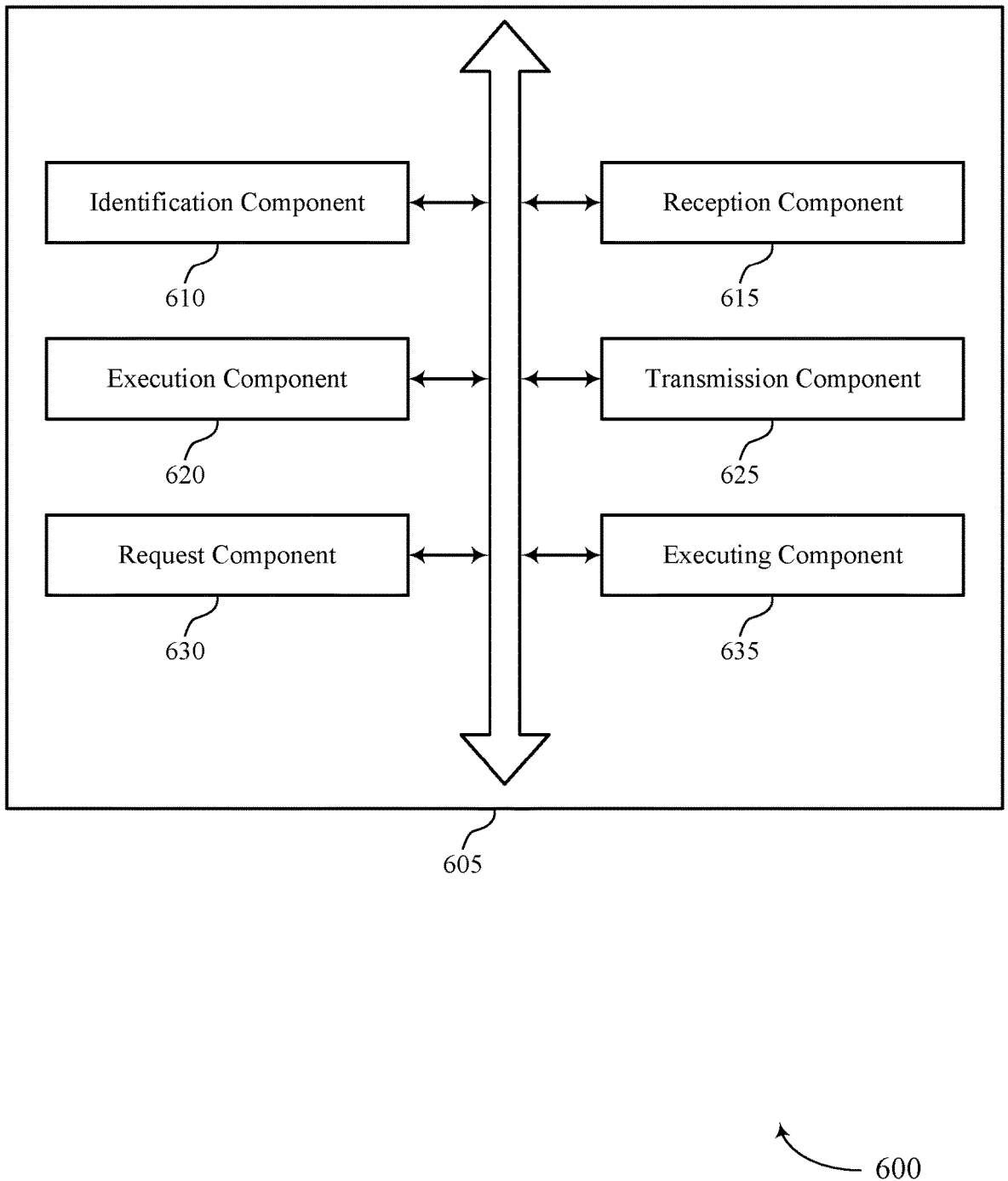
FIG. 6 shows a block diagram of a private data processing component that supports processing private data using a workflow action in accordance with aspects of the present disclosure.

FIG. 6 shows a block diagram 600 of a private data processing component 605 that supports processing private data using a workflow action in accordance with aspects of the present disclosure. The private data processing component 605 may be an example of aspects of a private data processing component 515 or a private data processing component 710 described herein. The private data processing component 605 may include an identification component 610, a reception component 615, an execution component 620, a transmission component 625, a request component 630, and an executing component 635. Each of these modules may communicate, directly or indirectly, with one another (e.g., via one or more buses).

The identification component 610 may identify, at a user device that is authenticated to access a local system, an action of a workflow that is running on an external server that is external to the local system, where the action involves processing private data stored within the local system. In some examples, the identification component 610 may identify, at the user device that is authenticated to access the local system, a subsequent action of the workflow that is running on the external server that is external to the local system based on transmitting the indication of the result of the action.

The reception component 615 may receive, at the user device, a direct data query associated with the action, the direct data query including a set of encoded instructions that are self-extracting upon being executed by a browser of the user device. In some cases, reception component 615 may dynamically receive the direct data query associated with the action based at based on identifying the action of the workflow.

The execution component 620 may execute, by the browser of the user device, the set of encoded instructions to directly access the private data. In some examples, executing the set of encoded instructions includes downloading the set of encoded instructions to the user device and adding the set of encoded instructions to the action of the workflow. In some cases, the set of encoded instructions includes JavaScript.

The transmission component 625 may transmit an indication of a result of the action based on directly accessing the private data.

The request component 630 may request, by the browser of the user device, the set of encoded instructions to directly access the private data based on the direct data query associated with the action.

The executing component 635 may execute, by the browser of the user device, the set of encoded instructions to directly access the private data. In some examples, the executing component 635 may execute the set of encoded instructions based in part on the direct data query associated with the action.

Figure 7:
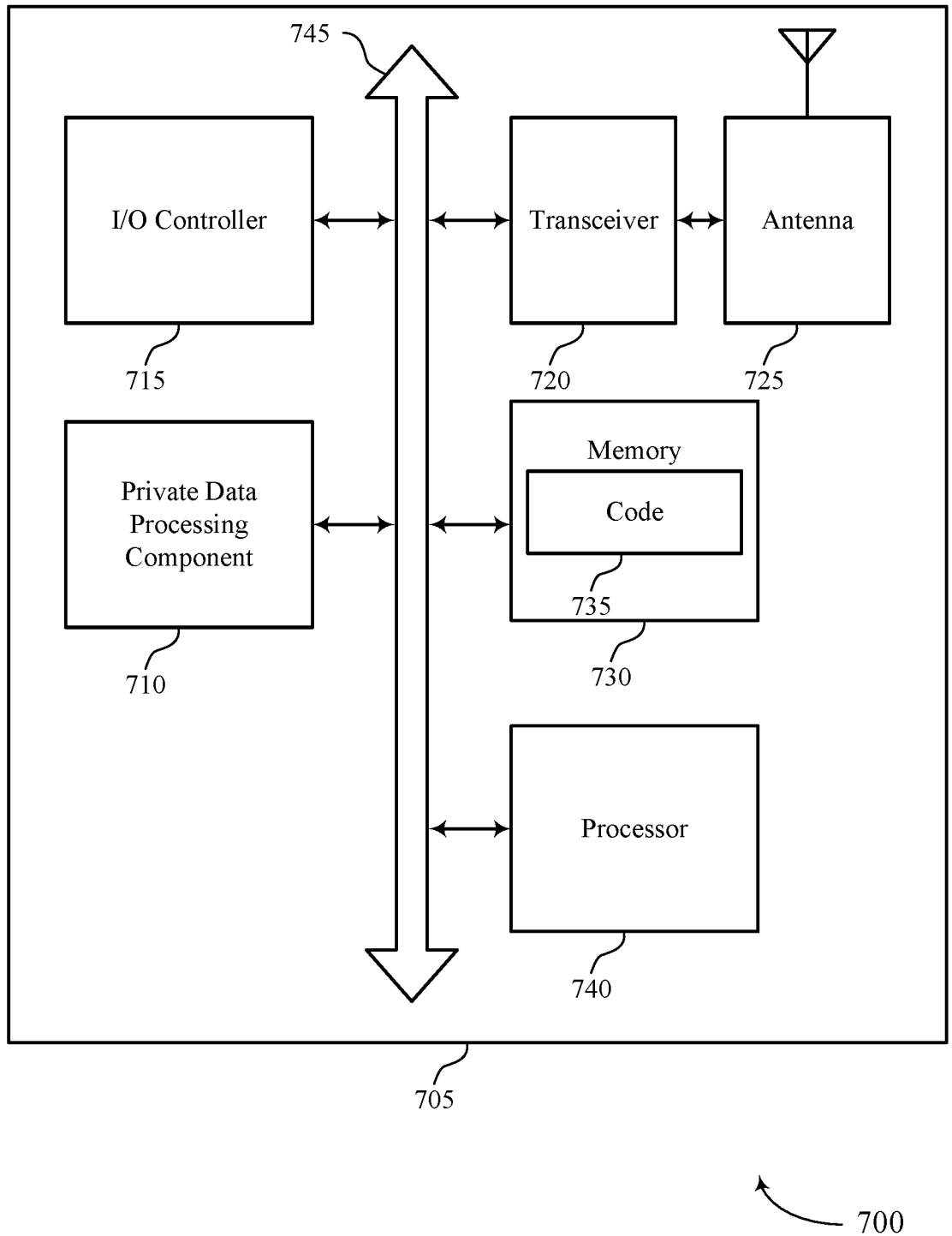
FIG. 7 shows a diagram of a system including a device that supports processing private data using a workflow action in accordance with aspects of the present disclosure.

FIG. 7 shows a diagram of a system 700 including a device 705 that supports processing private data using a workflow action in accordance with aspects of the present disclosure. The device 705 may be an example of or include the components of device 505 as described herein. The device 705 may include components for bi-directional voice and data communications including components for transmitting and receiving communications, including a private data processing component 710, an I/O controller 715, a transceiver 720, an antenna 725, memory 730, and a processor 740. These components may be in electronic communication via one or more buses (e.g., bus 745).

The private data processing component 710 may identify, at a user device that is authenticated to access a local system, an action of a workflow that is running on an external server that is external to the local system, where the action involves processing private data stored within the local system, receive, at the user device, a direct data query associated with the action, the direct data query including a set of encoded instructions that are self-extracting upon being executed by a browser of the user device, execute, by the browser of the user device, the set of encoded instructions to directly access the private data, and transmit an indication of a result of the action based on directly accessing the private data.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting processing private data using a workflow action).

The code 735 may include instructions to implement aspects of the present disclosure, including instructions to support database processing. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
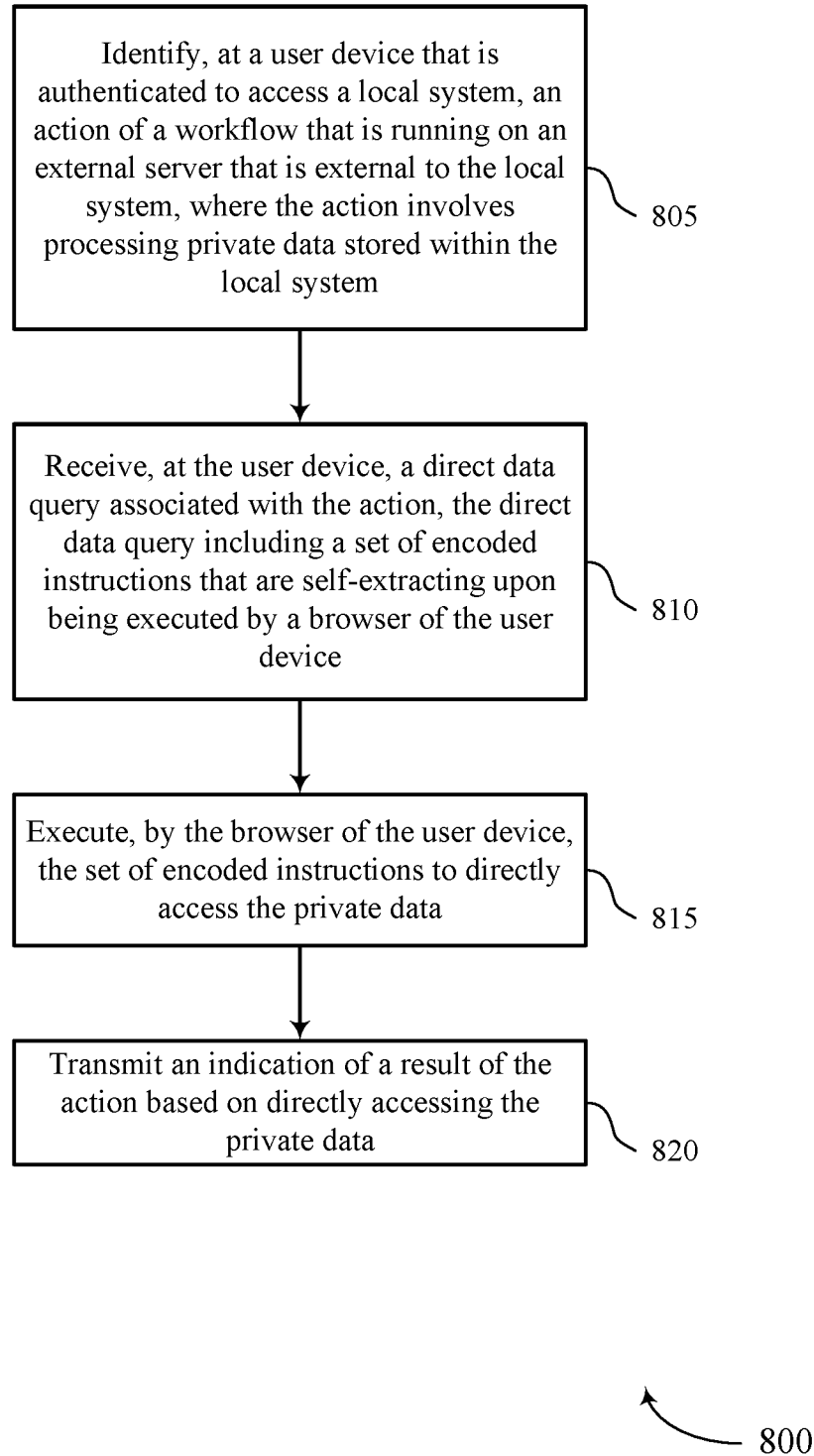
FIGS. 8 through 11 show flowcharts illustrating methods that support processing private data using a workflow action in accordance with aspects of the present disclosure.

FIG. 8 shows a flowchart illustrating a method 800 that supports processing private data using a workflow action in accordance with aspects of the present disclosure. The operations of method 800 may be implemented by a device or its components as described herein. For example, the operations of method 800 may be performed by a private data processing component as described with reference to FIGS. 5 through 7. In some examples, a device may execute a set of instructions to control the functional elements of the device to perform the functions described below. Additionally or alternatively, a device may perform aspects of the functions described below using special-purpose hardware.

At 805, the device may identify, at a user device that is authenticated to access a local system, an action of a workflow that is running on an external server that is external to the local system, where the action involves processing private data stored within the local system. The operations of 805 may be performed according to the methods described herein. In some examples, aspects of the operations of 805 may be performed by an identification component as described with reference to FIGS. 5 and 6.

At 810, the device may receive, at the user device, a direct data query associated with the action, the direct data query including a set of encoded instructions that are self-extracting upon being executed by a browser of the user device. The operations of 810 may be performed according to the methods described herein. In some examples, aspects of the operations of 810 may be performed by a reception component as described with reference to FIGS. 5 and 6.

At 815, the device may execute, by the browser of the user device, the set of encoded instructions to directly access the private data. The operations of 815 may be performed according to the methods described herein. In some examples, aspects of the operations of 815 may be performed by an execution component as described with reference to FIGS. 5 and 6.

At 820, the device may transmit an indication of a result of the action based on directly accessing the private data. The operations of 820 may be performed according to the methods described herein. In some examples, aspects of the operations of 820 may be performed by a transmission component as described with reference to FIGS. 5 and 6.

Figure 9:
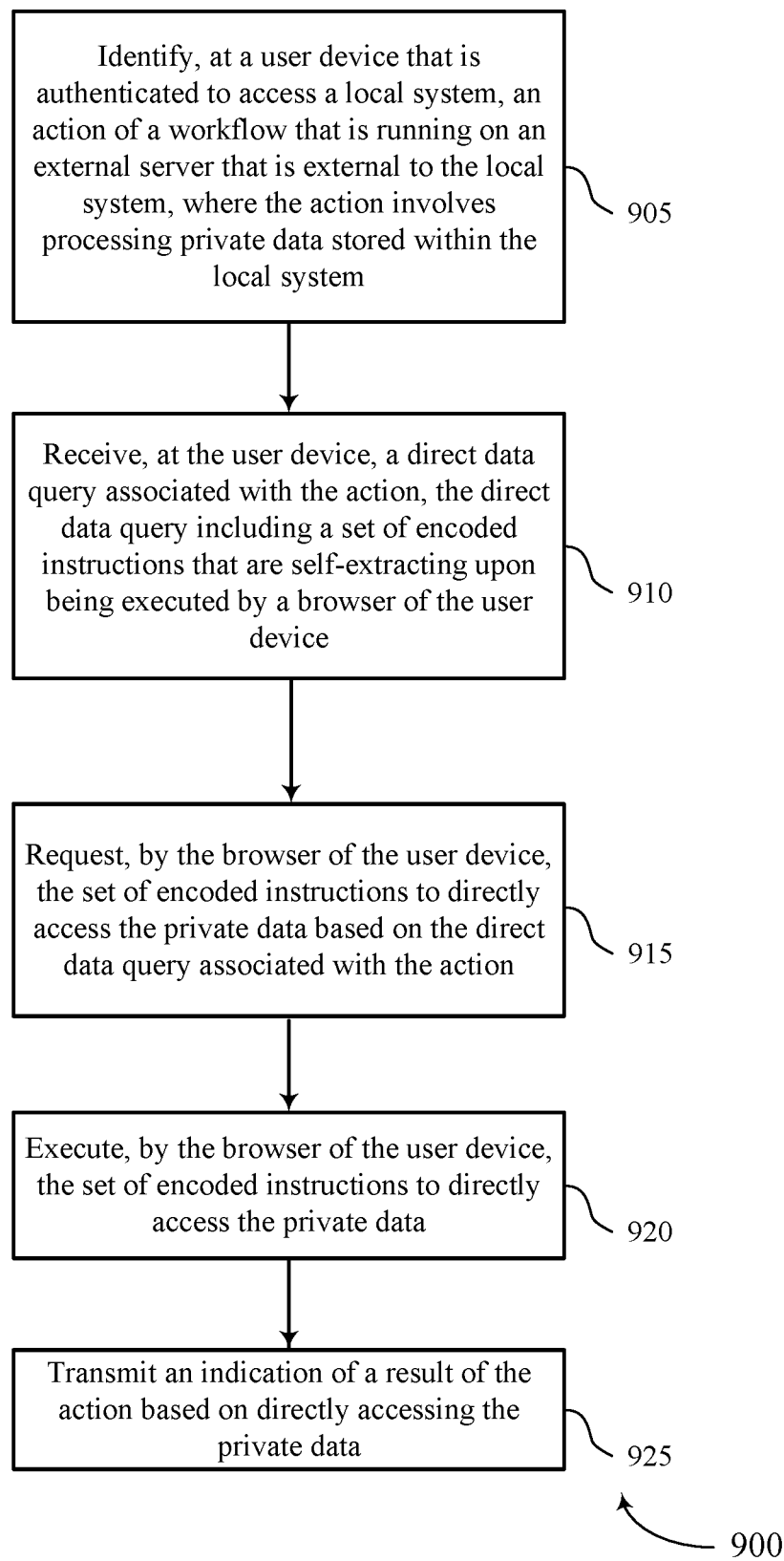

FIG. 9 shows a flowchart illustrating a method 900 that supports processing private data using a workflow action in accordance with aspects of the present disclosure. The operations of method 900 may be implemented by a device or its components as described herein. For example, the operations of method 900 may be performed by a private data processing component as described with reference to FIGS. 5 through 7. In some examples, a device may execute a set of instructions to control the functional elements of the device to perform the functions described below. Additionally or alternatively, a device may perform aspects of the functions described below using special-purpose hardware.

At 905, the device may identify, at a user device that is authenticated to access a local system, an action of a workflow that is running on an external server that is external to the local system, where the action involves processing private data stored within the local system. The operations of 905 may be performed according to the methods described herein. In some examples, aspects of the operations of 905 may be performed by an identification component as described with reference to FIGS. 5 and 6.

At 910, the device may receive, at the user device, a direct data query associated with the action, the direct data query including a set of encoded instructions that are self-extracting upon being executed by a browser of the user device. The operations of 910 may be performed according to the methods described herein. In some examples, aspects of the operations of 910 may be performed by a reception component as described with reference to FIGS. 5 and 6.

At 915, the device may request, by the browser of the user device, the set of encoded instructions to directly access the private data based on the direct data query associated with the action. The operations of 915 may be performed according to the methods described herein. In some examples, aspects of the operations of 915 may be performed by a request component as described with reference to FIGS. 5 and 6.

At 920, the device may execute, by the browser of the user device, the set of encoded instructions to directly access the private data. The operations of 920 may be performed according to the methods described herein. In some examples, aspects of the operations of 920 may be performed by an execution component as described with reference to FIGS. 5 and 6.

At 925, the device may transmit an indication of a result of the action based on directly accessing the private data. The operations of 925 may be performed according to the methods described herein. In some examples, aspects of the operations of 925 may be performed by a transmission component as described with reference to FIGS. 5 and 6.

Figure 10:
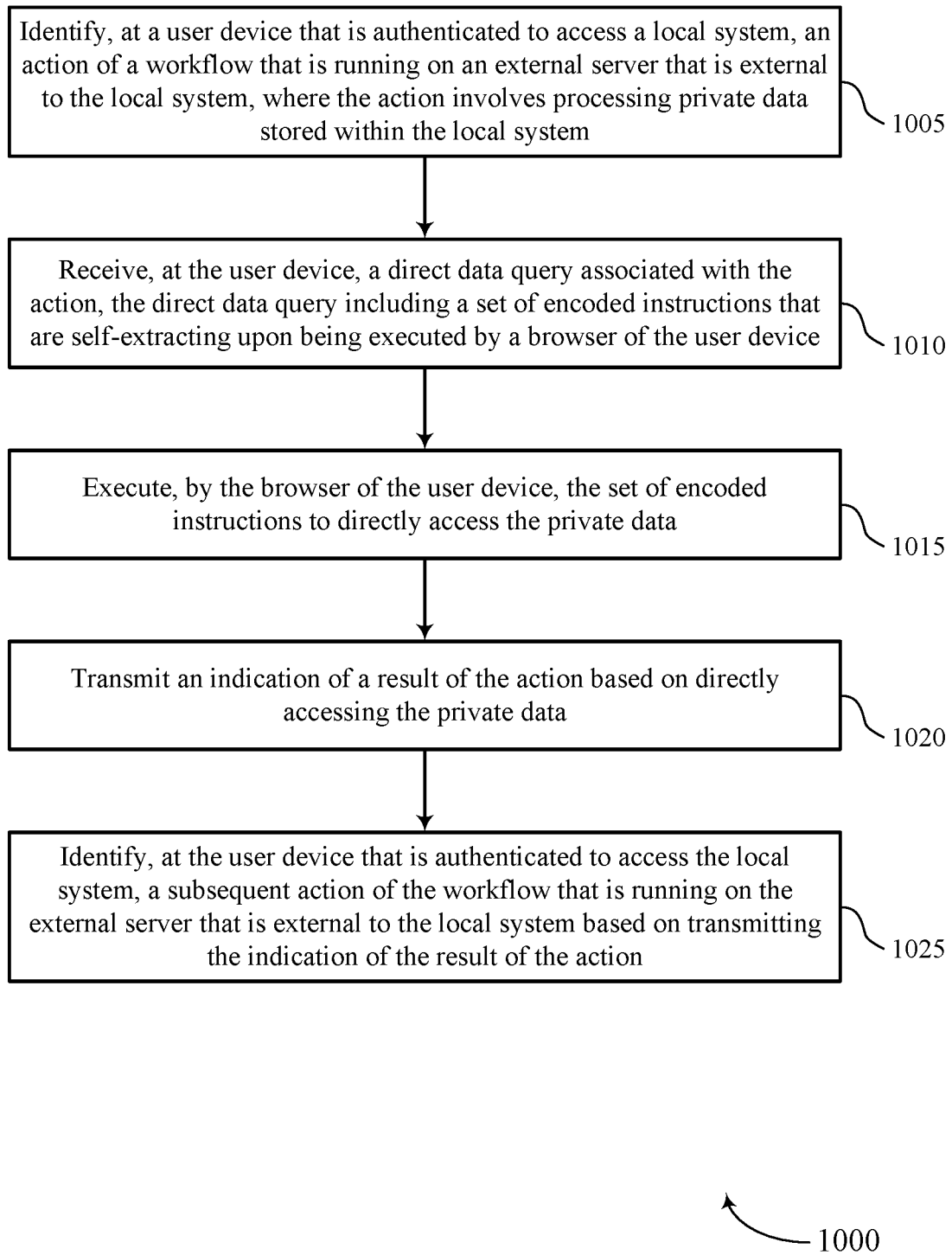

FIG. 10 shows a flowchart illustrating a method 1000 that supports processing private data using a workflow action in accordance with aspects of the present disclosure. The operations of method 1000 may be implemented by a device or its components as described herein. For example, the operations of method 1000 may be performed by a private data processing component as described with reference to FIGS. 5 through 7. In some examples, a device may execute a set of instructions to control the functional elements of the device to perform the functions described below. Additionally or alternatively, a device may perform aspects of the functions described below using special-purpose hardware.

At 1005, the device may identify, at a user device that is authenticated to access a local system, an action of a workflow that is running on an external server that is external to the local system, where the action involves processing private data stored within the local system. The operations of 1005 may be performed according to the methods described herein. In some examples, aspects of the operations of 1005 may be performed by an identification component as described with reference to FIGS. 5 and 6.

At 1010, the device may receive, at the user device, a direct data query associated with the action, the direct data query including a set of encoded instructions that are self-extracting upon being executed by a browser of the user device. The operations of 1010 may be performed according to the methods described herein. In some examples, aspects of the operations of 1010 may be performed by a reception component as described with reference to FIGS. 5 and 6.

At 1015, the device may execute, by the browser of the user device, the set of encoded instructions to directly access the private data. The operations of 1015 may be performed according to the methods described herein. In some examples, aspects of the operations of 1015 may be performed by an execution component as described with reference to FIGS. 5 and 6.

At 1020, the device may transmit an indication of a result of the action based on directly accessing the private data. The operations of 1020 may be performed according to the methods described herein. In some examples, aspects of the operations of 1020 may be performed by a transmission component as described with reference to FIGS. 5 and 6.

At 1025, the device may identify, at the user device that is authenticated to access the local system, a subsequent action of the workflow that is running on the external server that is external to the local system based on transmitting the indication of the result of the action. The operations of 1025 may be performed according to the methods described herein. In some examples, aspects of the operations of 1025 may be performed by an identification component as described with reference to FIGS. 5 and 6.

Figure 11:
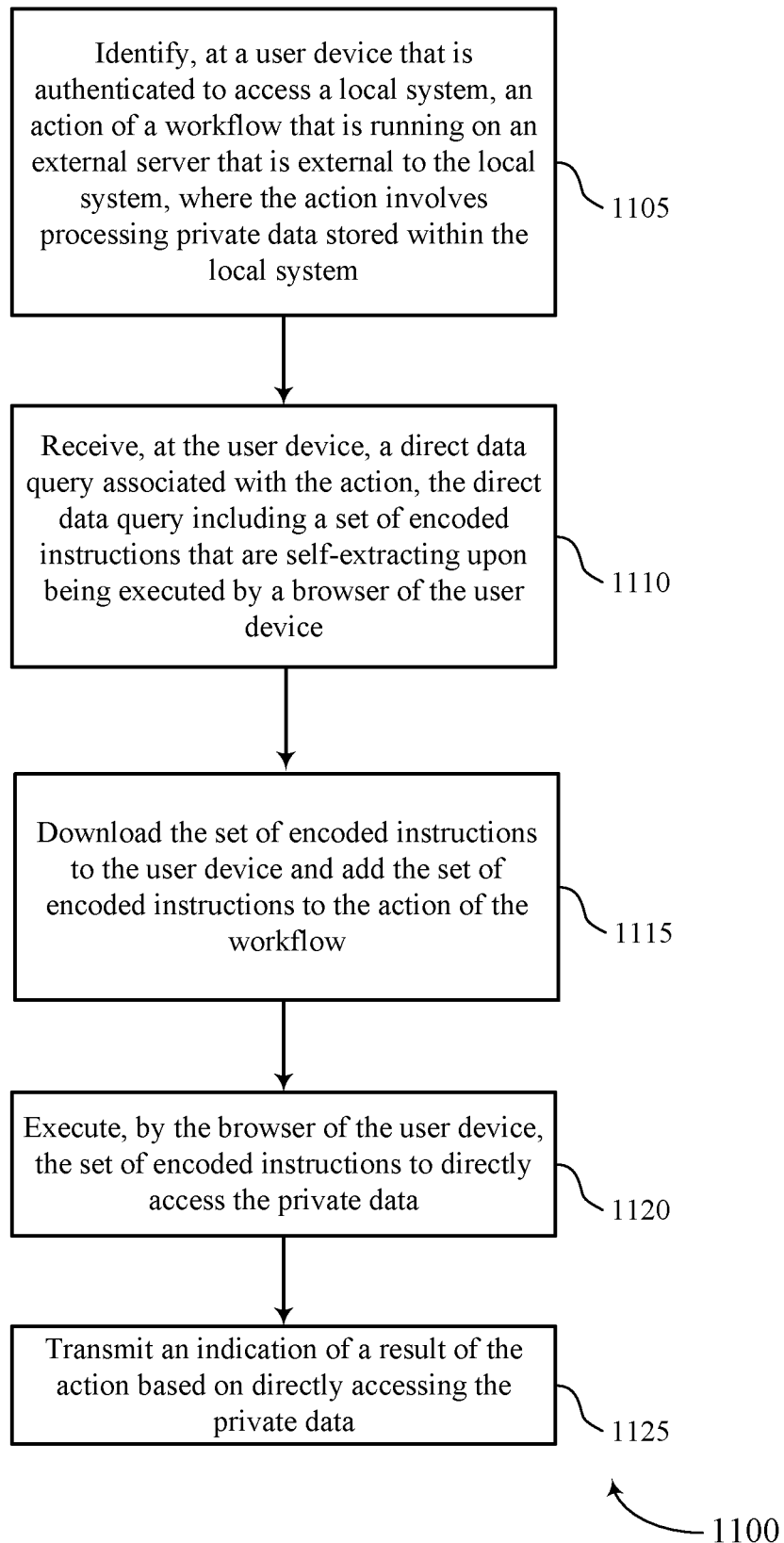

FIG. 11 shows a flowchart illustrating a method 1100 that supports processing private data using a workflow action in accordance with aspects of the present disclosure. The operations of method 1100 may be implemented by a device or its components as described herein. For example, the operations of method 1100 may be performed by a private data processing component as described with reference to FIGS. 5 through 7. In some examples, a device may execute a set of instructions to control the functional elements of the device to perform the functions described below. Additionally or alternatively, a device may perform aspects of the functions described below using special-purpose hardware.

At 1105, the device may identify, at a user device that is authenticated to access a local system, an action of a workflow that is running on an external server that is external to the local system, where the action involves processing private data stored within the local system. The operations of 1105 may be performed according to the methods described herein. In some examples, aspects of the operations of 1105 may be performed by an identification component as described with reference to FIGS. 5 and 6.

At 1110, the device may receive, at the user device, a direct data query associated with the action, the direct data query including a set of encoded instructions that are self-extracting upon being executed by a browser of the user device. The operations of 1110 may be performed according to the methods described herein. In some examples, aspects of the operations of 1110 may be performed by a reception component as described with reference to FIGS. 5 and 6.

At 1115, the device may execute the set of encoded instructions which may include downloading the set of encoded instructions to the user device and adding the set of encoded instructions to the action of the workflow. The operations of 1115 may be performed according to the methods described herein. In some examples, aspects of the operations of 1115 may be performed by an execution component as described with reference to FIGS. 5 and 6.

At 1120, the device may execute, by the browser of the user device, the set of encoded instructions to directly access the private data. The operations of 1120 may be performed according to the methods described herein. In some examples, aspects of the operations of 1120 may be performed by an execution component as described with reference to FIGS. 5 and 6.

At 1125, the device may transmit an indication of a result of the action based on directly accessing the private data. The operations of 1125 may be performed according to the methods described herein. In some examples, aspects of the operations of 1125 may be performed by a transmission component as described with reference to FIGS. 5 and 6.

A method of database processing is described. The method may include identifying, at a user device that is authenticated to access a local system, an action of a workflow that is running on an external server that is external to the local system, where the action involves processing private data stored within the local system, receiving, at the user device, a direct data query associated with the action, the direct data query including a set of encoded instructions that are self-extracting upon being executed by a browser of the user device, executing, by the browser of the user device, the set of encoded instructions to directly access the private data, and transmitting an indication of a result of the action based on directly accessing the private data.

An apparatus for database processing is described. The apparatus may include a processor, memory in electronic communication with the processor, and instructions stored in the memory. The instructions may be executable by the processor to cause the apparatus to identify, at a user device that is authenticated to access a local system, an action of a workflow that is running on an external server that is external to the local system, where the action involves processing private data stored within the local system, receive, at the user device, a direct data query associated with the action, the direct data query including a set of encoded instructions that are self-extracting upon being executed by a browser of the user device, execute, by the browser of the user device, the set of encoded instructions to directly access the private data, and transmit an indication of a result of the action based on directly accessing the private data.

Another apparatus for database processing is described. The apparatus may include means for identifying, at a user device that is authenticated to access a local system, an action of a workflow that is running on an external server that is external to the local system, where the action involves processing private data stored within the local system, receiving, at the user device, a direct data query associated with the action, the direct data query including a set of encoded instructions that are self-extracting upon being executed by a browser of the user device, executing, by the browser of the user device, the set of encoded instructions to directly access the private data, and transmitting an indication of a result of the action based on directly accessing the private data.

A non-transitory computer-readable medium storing code for database processing is described. The code may include instructions executable by a processor to identify, at a user device that is authenticated to access a local system, an action of a workflow that is running on an external server that is external to the local system, where the action involves processing private data stored within the local system, receive, at the user device, a direct data query associated with the action, the direct data query including a set of encoded instructions that are self-extracting upon being executed by a browser of the user device, execute, by the browser of the user device, the set of encoded instructions to directly access the private data, and transmit an indication of a result of the action based on directly accessing the private data.

Some examples of the method, apparatuses, and non-transitory computer-readable medium described herein may further include operations, features, means, or instructions for requesting, by the browser of the user device, the set of encoded instructions to directly access the private data based on the direct data query associated with the action.

Some examples of the method, apparatuses, and non-transitory computer-readable medium described herein may further include operations, features, means, or instructions for identifying, at the user device that may be authenticated to access the local system, a subsequent action of the workflow that may be running on the external server that may be external to the local system based on transmitting the indication of the result of the action.

In some examples of the method, apparatuses, and non-transitory computer-readable medium described herein, executing the set of encoded instructions may include operations, features, means, or instructions for downloading the set of encoded instructions to the user device and adding the set of encoded instructions to the action of the workflow. In some examples of the method, apparatuses, and non-transitory computer-readable medium described herein, the set of encoded instructions may be based on the direct data query associated with the action. In some examples of the method, apparatuses, and non-transitory computer-readable medium described herein, the browser of the user device may be associated with a self-contained, reusable portion of an application installed on the user device.

In some examples of the method, apparatuses, and non-transitory computer-readable medium described herein, the direct data query associated with the action may be received dynamically based at based on identifying the action of the workflow. In some examples of the method, apparatuses, and non-transitory computer-readable medium described herein, the set of encoded instructions includes JavaScript. In some examples of the method, apparatuses, and non-transitory computer-readable medium described herein, the local system includes an on-premise system.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for database processing, comprising:
   identifying, at an external server that is external to a local system that is associated with a user device authenticated to access the local system, an action of a workflow that is running on the external server, wherein the action involves processing private data that is stored within the local system;
   transmitting, to the user device based at least in part on identifying the action, a set of instructions that are configured to access and process the private data that is stored within the local system; and
   receiving, from the user device based at least in part on transmitting the set of instructions, a result of execution of the set of instructions by the user device.

2. The method of claim 1, wherein transmitting the set of instructions comprises:
   transmitting, to the user device, a direct data query associated with the action and the set of instructions include a first instruction for directly accessing the private data and a second instruction for performing the action at the user device based at least in part on a result of executing the first instruction.

3. The method of claim 2, wherein the second instruction is configured to mask content of the private data as the result.

4. The method of claim 2, wherein the set of instructions are encoded and are configured to be self-extracting upon being executed by a browser of the user device.

5. The method of claim 1, wherein receiving the result comprises:
   receiving the result that masks the private data accessed by the user device from the local system resulting from the set of instructions being executed on the user device.

6. The method of claim 1, further comprising:
   receiving, from the user device, a request for the set of instructions to directly access the private data, wherein the set of instructions are transmitted in response to the request.

7. The method of claim 1, wherein the set of instructions comprises JavaScript.

8. An apparatus for database processing, comprising:
   a processor;
   memory coupled with the processor; and
   instructions stored in the memory and executable by the processor to cause the apparatus to:
      identify, at an external server that is external to a local system that is associated with a user device authenticated to access the local system, an action of a workflow that is running on the external server, wherein the action involves processing private data that is stored within the local system;

transmit, to the user device based at least in part on identifying the action, a set of instructions that are configured to access and process the private data that is stored within the local system; and receive, from the user device based at least in part on transmitting the set of instructions, a result of execution of the set of instructions by the user device.

9. The apparatus of claim 8, wherein the instructions to transmit the set of instructions are executable by the processor to cause the apparatus to:

transmit, to the user device, a direct data query associated with the action and the set of instructions include a first instruction for directly accessing the private data and a second instruction for performing the action at the user device based at least in part on a result of executing the first instruction.

10. The apparatus of claim 9, wherein the second instruction is configured to mask content of the private data as the result.

11. The apparatus of claim 9, wherein the set of instructions are encoded and are configured to be self-extracting upon being executed by a browser of the user device.

12. The apparatus of claim 8, wherein the instructions to receive the result are executable by the processor to cause the apparatus to:

receive the result that masks the private data accessed by the user device from the local system resulting from the set of instructions being executed on the user device.

13. The apparatus of claim 8, wherein the instructions are further executable by the processor to cause the apparatus to:

receive, from the user device, a request for the set of instructions to directly access the private data, wherein the set of instructions are transmitted in response to the request.

14. The apparatus of claim 8, wherein:

the set of instructions comprises JavaScript.

15. A non-transitory computer-readable medium storing code for database processing, the code comprising instructions executable by a processor to:

identify, at an external server that is external to a local system that is associated with a user device authenticated to access the local system, an action of a workflow that is running on the external server, wherein the action involves processing private data that is stored within the local system;

transmit, to the user device based at least in part on identifying the action, a set of instructions that are configured to access and process the private data that is stored within the local system; and receive, from the user device based at least in part on transmitting the set of instructions, a result of execution of the set of instructions by the user device.

16. The non-transitory computer-readable medium of claim 15, wherein the instructions to transmit the set of instructions are executable by the processor to:

transmit, to the user device, a direct data query associated with the action and the set of instructions include a first instruction for directly accessing the private data and a second instruction for performing the action at the user device based at least in part on a result of executing the first instruction.

17. The non-transitory computer-readable medium of claim 16, wherein the second instruction is configured to mask content of the private data as the result.

18. The non-transitory computer-readable medium of claim 16, wherein the set of instructions are encoded and are configured to be self-extracting upon being executed by a browser of the user device.

19. The non-transitory computer-readable medium of claim 15, wherein the instructions to receive the result are executable by the processor to:

receive the result that masks the private data accessed by the user device from the local system resulting from the set of instructions being executed on the user device.

20. The non-transitory computer-readable medium of claim 15, wherein the instructions are further executable by the processor to:

receive, from the user device, a request for the set of instructions to directly access the private data, wherein the set of instructions are transmitted in response to the request.

* * * * *